United States Patent [19]

Psaltopoulos

[11] Patent Number: 4,826,089
[45] Date of Patent: May 2, 1989

[54] TREATING ASPHALTENE BEARING FUELS

[75] Inventor: Emmanuel Psaltopoulos, Belmont, Mass.

[73] Assignee: Columbia Chase Corporation, Braintree, Mass.

[21] Appl. No.: 777,963

[22] Filed: Sep. 19, 1985

[51] Int. Cl.⁴ .............................................. B02C 19/12
[52] U.S. Cl. ........................................ 241/45; 241/95; 241/152 R
[58] Field of Search ................. 241/40, 45, 95, 152 R, 241/152 A, 274, 260.1, 163; 360/336, 337, 338, 325, 327, 329, 330

[56] References Cited

U.S. PATENT DOCUMENTS

| | | | |
|---|---|---|---|
| 1,959,712 | 5/1934 | Flowers | 366/330 X |
| 2,972,473 | 2/1961 | Heller | 241/163 X |
| 3,059,862 | 10/1962 | Rich | 241/152 R |
| 3,147,958 | 9/1964 | Stiffler | 366/327 |
| 3,203,371 | 8/1965 | Mosey | 366/336 X |
| 3,279,894 | 10/1966 | Tate et al. | 366/330 X |
| 3,923,288 | 12/1975 | King | 366/336 |
| 4,004,786 | 1/1977 | Stephens | 366/327 |
| 4,258,782 | 3/1981 | Kao | 366/338 X |
| 4,344,580 | 8/1982 | Hoshall et al. | 241/260.1 X |

FOREIGN PATENT DOCUMENTS 152438  7/1953  Australia ..................... 241/152 R Primary Examiner—Howard N. Goldberg
Assistant Examiner—Joseph M. Gorski
Attorney, Agent, or Firm—Andrew F. Kehoe

[57] ABSTRACT

A static, flow-conditioner apparatus comprising a series of closely spaced shearing edges which contact and condition liquid flowing thereby. The edges are advantageously carried on propellor-shaped articles and mounted on an axial shaft in conduit forming a confined liquid flow space. It is advantageous to modify flow patterns by changes in edge configuration and flow patterns within spaces between closely packed group of the shearing edge-bearing members. Particularly, utility is found in reducing the asphaltene "particles" or "globules" in heavy fuel oil to extremely small size so they are readily burned in a boiler with reduced particulates in the stack effluent.

5 Claims, 2 Drawing Sheets

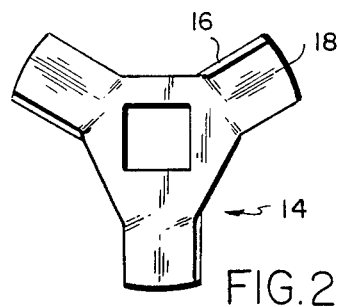 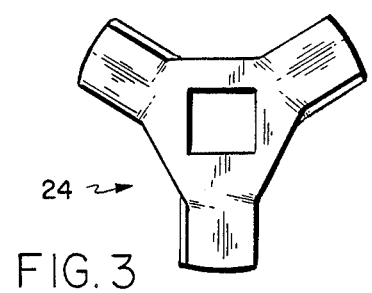
FIG.2  FIG.3
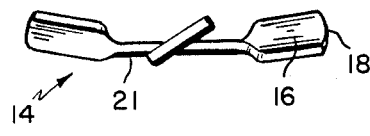 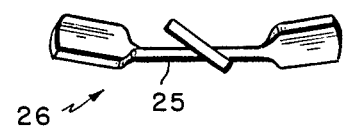
FIG.4  FIG.5

TREATING ASPHALTENE BEARING FUELS

BACKGROUND OF THE INVENTION

U.S. Pat. No. 4,109,318 to Hutchins discloses an inline blender having propellor-like blades of graduated configuration placed along a central shaft of a flow conduit. The blades form continuous spiral mixing channels which extend well into the center of the conduit. U.S. Pat. No. 4,123,178 to Salzman et al discloses a similar inline blender. In each of the above patents a number of propellor-like blades are mounted on a central shaft to impart a general swirl-type motion to a liquid travelling therethrough. Reversal of the direction of swirl is recognized as a mixing expedient. Numerous other static devices, usually mixers, are disclosed in the art as contributing some desirable property to a liquid flowing therethrough. See for example, U.S. Pat. Nos. 4,441,823; 3,582,048; 4,427,030 and the like.

Also, in prior art, but not heretofore related to static mixers, is U.S. Pat. No. 4,479,805 to Batra which disclosed the pumping of an asphaltene-bearing oil through a perforated pipe to reduce the particle size to asphaltene particularly when the asphaltene was carried in water-oil emulsions. Notwithstanding the process of Batra, it was found that the variety of asphaltene in oil and made still further improvements in asphaltene conditioning desirable in order to reduce the particulate emissions from stack gas.

An additional aspect of the commercial background of the invention is the fact that heavy fuel oils have had varying increasing amounts of asphaltene therein and the quantity of quality of asphaltene can vary considerably shipment-to-shipment.

SUMMARY OF THE INVENTION

It is a principle object of the invention to provide an improved high-intensity apparatus for use in liquid processing.

It is a particular object of the invention to provide an improved process for reducing the size of undesirably large asphaltene particles in heavy fuel oils, thereby rendering the oil more suitable for clean combustion.

A further object of the invention is to provide a one-pass process for treating asphaltene-bearing fuel oils to reduce the size of asphaltene particles.

A further object of the invention is to provide a process and apparatus which may be varied in configuration quickly and inexpensively to meet the requirement of a specific shearing problem presented by various heavy fuels carrying asphaltene of different characteristics.

Other objects of the invention will be obvious to those skilled in the art on their reading of this application.

The above objects have been achieved by providing a fluid processing element comprising a conduit, the flow path of which is obstructed with stationary shearing edges designed to cause intensive shearing of the liquid being processed. It is also advantageous that the apparatus have a substantial mixing characteristic to assure that all liquid is treated during passage through the apparatus. The same elements that carry the shearing edges can also act as mixing means. This is particularly true when small sharp-edged blades are used as the shearing means.

In the preferred embodiment of the invention, the shearing edges are carried on groups of closely-packed, propellor-like elements. Groups of the elements with similar pitch relative to the fluid flow are spaced at short distances from one another to assure some mixing and that all of the liquid is processed by the blades. The inner wall of the conduit in which the blades are placed are sufficiently close to the outer periphery of the blade elements that a substantial amount of flow occurs in helix-like paths formed by the elements.

It has been discovered that when heavy fuel oils, e.g. No. 6 and No. 10 oils, are processed through the apparatus of the invention, most asphaltene "particles" are reduced in particle size from their initial-size—often 15 to 50 microns—to below 10 microns in average diameter.

The desired cominuting action can be achieved in a short length of reactor and in a single pass, a major advance over the shear-processing of asphaltene heretofore known to the art. In the most advantageous embodiments of the invention, the shearing elements are divided into a variety of processing zones. Some such zones are described below.

A flow-orientation zone. This zone provides a swirl to the liquid. Preferably, they are formed of shearing elements. However, because of relatively great spacing, the shearing elements are generally less-effective in the flow-orienting zone than in the more compact particle-shear zones. Typically, there are about 1.5 to 3 swirls (i.e. 360° —helical turns) initiated per inch of length of the flow-orientation zone when a 1-inch diameter restraining conduit is used.

A particle-shear zone is a relatively compact arrangement of shearing edges, typically with about 3.0 to about 6 helical "swirls" initiated per inch when a 1-inch restraining conduit is used.

Still another shear type zone is a baffled-shear zone one which provides a baffled-swirl flow path. In a typical arrangement the centerline of the flow path is generally helical but follows a zig-zag pattern. The spacing of the swirl flow paths are about the same as those in the primary particle-shear zone. However the baffled-shear zone serves as an effective particle shearing device but contributes more pressure drop to the system than do the other zones.

It is advantageous—but not necessary—to have spaces between zones along the flow path which can be utilized to facilitate change in flow patterns from zone-to-zone. In such spaces it is often desirable to have conduit baffling, as narrowing means, to direct the liquid inwardly toward the shearing elements to avoid any undesirable bypassing.

The flow configurations—particularly those which are principally used to achieve the asphaltene cominuting action—are desirably formed of small stamped propellors which, when mounted adjacent to one another on a shaft, leave small gaps between propellors, simulating what would be small v-shaped slits in a one-piece helical element. However, in addition to the slits, it has been found helpful to have the propellors sufficiently irregular (inherent in a stamping process of manufacture for propellors as shown) that the propellor surfaces are somewhat and irregularly offset from one another along what would otherwise be an idealized helical flow path. Of course this offset condition is inherent, and relatively severe, in the baffled-swirl flow path.

A typical asphaltene-shearing application according to the invention can utilize a series of elements mounted in parallel one with the other, each one adapted to handle a proportion only of the total flow of petroleum product. Depending on the design parameters of a given facility several dozen of the devices may be utilized to condition fuel.

One of the problems with conditioning asphaltene-bearing oils such as No. 6 and No. 10 fuel oil is that the term "asphaltene" can refer to material of substantially different characteristics depending upon the source of petroleum and its treatment after withdrawal from its source. Thus, even within a given fuel shipment, the "asphaltene" can comprise some very small particles of brittle solids although much of it will be more in the nature of small globules of a pitch-like substance. In any event, it has been found desirable to subject many asphaltene-bearing oils to a much more severe shearing treatment than that disclosed in U.S. Pat. No. 4,479,805 to Batra. However, surprisingly, and probably because of the great variety in asphaltene forms, it has been found that the process described by Batra can be of incremental value in treating asphaltenes when it is used in series with the apparatus newly described herein. Moreover, the addition of water to the fuel system appears to provide some advantage in achieving good asphaltene.

Thus, the apparatus comprises an exterior conduit having a diameter which forms means to constrain the flow of the oil and direct the flow of the oil against and through at least two spaced arrays of multi-bladed, propellor-like, seearing elements which are fixed on a fixed supporting shaft which is mounted axially within the exterior conduit. Within each of the arrays, about six elements are mounted on the fixed shaft per unit of shaft length approximately equal to the diameter of the conduit. The blades of the shearing elements are slanted and propellor like from the plane, perpendicular to the length of the shaft which has shearing edges arranged to be impacted by the asphaltene particles flow in the oil. Within each array, adjacent blade-bearing elements are angularly offset from one another along the shaft and form wall sections defining helical paths. The wall sections have spaced openings between the blade elements, these spaced openings are generally V-shaped, with the angle formed by legs of each V-shaped opening being closer to the shaft than the mouth ©f each opening. At least one array has its shearing elements so arranged that the helical path thereof is counterclockwise, relative to the shaft, and a fluid flowing from an end of the conduit. At least one other array has its elements so arranged such that the helical path thereof is clockwise relative to the shaft and a fluid flows from the same end of the conduit.

It is also well to include additional spaced arrays of propellor-like elements when the above-noted arrays have about sixteen (16) elements inserted on the shaft per unit of shaft length approximately equal to the diameter of the conduit.

Thus, in a preferred embodiment, an additional pair of spaced arrays is used. One of these additional pair arrays also has its elements so arranged that the helical path is counterclockwise relative to the shaft and the other pair of array also has its blade-bearing elements so arranged that the helical path thereof is clockwise relative to the shaft. Each of these arrays comprises about eight (8) elements on the shaft per unit of shaft length approximately equal to the diameter of the conduit.

ILLUSTRATIVE EXAMPLE OF THE INVENTION

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions herein are selected and included for the purposes of illustration in order that others skilled in the art will more fully understand the invention and the principles thereof and will be able to modify it and embody it in a variety of forms, each as may be best suited to the condition of a particular case.

IN THE DRAWINGS

FIG. 2 is a plan view of a "right-bend" blade-bearing element used in the apparatus of FIG. 1.

FIG. 3 is a plan view of a "left bend" blade-bearing element used in the apparatus of FIG. 1.

FIG. 4 is a side view of a typical "right-bend" shear-edge-bearing blade-bearing element useful with the invention.

FIG. 5 is analagous to FIG. 4 but shows a "left-bend" blade-bearing element.

FIG. 6 is an elevation of an array (50 in FIG. 1) of blade-bearing members forming a zig zag path between adjacent blades.

FIG. 7 is a diagram formed by inking the outer edges of the blade-bearing elements of FIG. 6 and rolling them on a paper.

Figure 1:
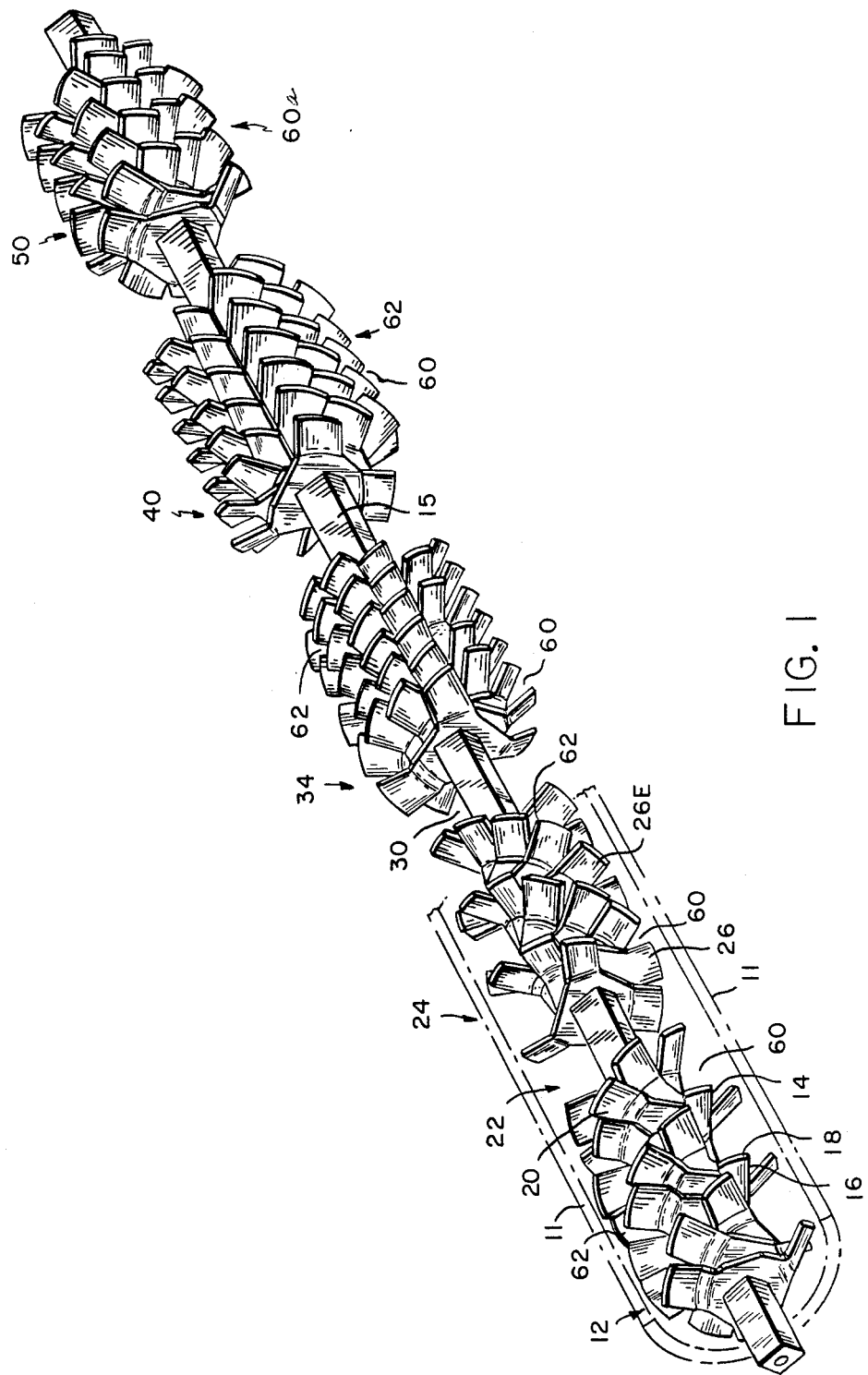
FIG. 1 is an exploded perspective view of an apparatus of the invention showing a restraining conduit and the asphaltene shearing arrays mounted in the conduit.

Referring to FIG. 1, it will be seen that petroleum entering the conduit 11 will meet an initial array 12 of right-bend elements 14 and generally directed in a helical clockwise path into the conduit.

The spacing of elements in zone 12 is achieved by having the appropriate face out and rotating the shaft 15, 90 degrees counterclockwise as each element is dropped onto the shaft from the right end in FIG. 1. It will be clear that the polygonal central shaft and element bores provides means to position the elements with precision relative to one another.

The lateral edges 16 and side edges 18 of the blades 20 tend to tear at the oil as it rushes past, acting to tear apart minute asphaltene particles, or globules, which are carried in the oil. In practice about a dozen blade-bearings elements of about an inch in diameter are utilized to form this so-called "right bend" processing section. The side designated as "21" in FIG. 4 is facing left in FIG. 1.

There is then space 22 in which there are no elements on central shaft 15. Thereupon, the oil encounters a processing section 24 which is similar to initial array 12 excepting that it is formed of "left-bend" elements 26 and, consequently forces a counter clockwise helical flow of the oil. The side designated as 25 in FIG. 5 is facing left in FIG. 1.

The spacing of blade-bearing elements of section, or zone, 24 is achieved by having the appropriate face out and rotating shaft 50, 90 degrees clockwise as each element is dropped onto the shaft from the right end in FIG. 1.

Again, there is an open space 30 following processing section 24 before the oil encounters a processing zone 34. This element consists of an array twenty-two right bend elements 14 as shown in FIGS. 2 and 4 with face 21 out as is the case with array 12 of the first processing zone; however, in section 24 they have been placed on the shaft differently, i.e. in section 24, elements 14 are placed with the same side up; but with the propellors offset from each other to achieve closer packing. Thus a more sharply pitched processing helix is formed on about twice as many propellor blades can be placed in an equivalent length of processing section 34. The helical flow path of the fuel being processed is generally clockwise and into the conduit.

The spacing of elements of section 34 is achieved by having the appropriate face out and rotating the shaft 90 degrees clockwise as each element is dropped onto the shaft from the right end in FIG. 1.

Next is an array of compactly-paced counterclockwise helical processing section 40 which bears the same relationship to section 24 that array 34 bears to array 12. "Left bend" elements 42 as seen in FIG. 3 and 5 are used to form section 40 and the face 25 of FIG. 5 is the one facing the oncoming flow.

The spacing of blade-bearing elements of section 40 is achieved by having the appropriate face out and rotating the shaft 90 degrees counterclockwise as each element is dropped onto the shaft from the right end in FIG. 1.

The fifth shearing section on the shaft is formed by placing alternating members of FIGS. 2 and 3 on the shaft alternately with sides 21 and 25 facing to the left in FIG. 1. The spacing of elements of section 50 is achieved by having the appropriate face out and rotating the shaft 90 degrees counterclockwise after each element is dropped onto the shaft from the right end of FIG. 1.

This array 50, if inspected closely, is also seen to have a generally helical flow path 60a. However, the centerline of the helical flow path follows a zig-zag course providing a particularly severe treatment of the oil before it exits from the device. Moreover, the relatively high pressure drop through this array provides a mechanism to fine-tune the flow characteristics of a particular liquid by adding and subtracting a number of blade-bearing elements from the shaft.

Thus it is seen that fuel oil, and more particularly globules of asphaltene therein, are constrained by conduit 11 in such a way that they tend to follow helical flow paths 60 formed by the shearing elements. Imperfect geometry of the blade causes a somewhat irregular offset of the shearing elements causes the asphaltene to be more effectively impacted and cominuted by edges 16 and 18 of the blades. The V-shaped open spaces 62, (with the angle by the two legs of the "V" of the "V" being more remote from the interior of the wall than the mouth of the "V") between the blades accentuates this effect. The particular configuration of a given array determines whether the amount resistance to flow and shearing capability. An array such as array 50 with a zig-zag helical path has particularly high shear capabilities. In general, it is desirable for the center line of a helical flow path to go through at least about ½ revolution per each unit length of an array which unit is equal to the average diameter of conduit 11.

It is also to be understood that the following claims are intended to cover all of the generic and specific features of the invention herein described and all statements of the scope of the invention which might be said to fall therebetween.

What is claimed is:

1. Apparatus for communting discrete asphaltene entities carried in a fuel oil, said apparatus comprising:
    (a) an exterior conduit having a diameter forming means to constrain flow of said oil and direct said flow of said oil;
    (b) at least two spaced arrays of multi-bladed shearing elements fixed on a fixed non-rotatable supporting shaft which is mounted axially with respect to and within said exterior conduit;
    (c) wherein, each said array has only about six said elements mounted on said fixed shaft per unit of shaft length which is equal to the diameter of said conduit;
    (d) wherein blades of said shearing elements are slanted, from the plane perpendicular to the length of said shaft and have shearing edges arranged to be impacted by said asphaltene particles flow in said oil;
    (e) and wherein, within each array, adjacent blade-bearing elements are angularly offset from one another along said shaft to form wall sections defining helical paths, said wall sections having V-shaped spaced openings between said blade elements with the angle formed by legs of each said V-shaped opening being closer to said shaft than the mouth of each said V-shaped opening is to said shaft; and
    (f) wherein at least one array has its shearing elements so arranged that the helical path thereof is counterclockwise, relative to said shaft, and a fluid flowing from an end of said conduit, and wherein at least one other said array has its elements so arranged such that the helical path thereof is clockwise relative to said shaft and a fluid flowing from said end of said conduit.

2. Apparatus as defined in claim 1 comprising at least one additional spaced array as defined in claim 1, said blade-bearing elements forming a helical path center line which follows a zig-zag path.

3. Apparatus as defined in claim 2 comprising at least an additional pair of spaced arrays of said elements each of said additional pair comprising a helical path wherein one of said additional pair of arrays has it s elements so arranged that the helical path is counter-clockwise relative to said shaft, and wherein the other of said additional pair of arrays has blade-bearing elements thereof so arranged that the helical path thereof is clockwise relative to said shaft.

4. Apparatus as defined in claim 1 comprising an additional pair of spaced arrays of said elements, each additional array comprising a helical path wherein one of said additional pair of arrays has its elements so arranged that the helical path is counter-clockwise relative to said shaft, and wherein the other of said additional pair of arrays has blade-bearing elemetns thereof so arranged that the helical path thereof is clockwise relative to said shaft.

5. Apparatus as defined in claims 4 or 3 wherein, within said spaced array of elements, only about eight said elements are inserted on said shaft per unit of shaft length which is equal to the diameter of said conduit.